E. E. MAHER.
LOCK NUT.
APPLICATION FILED OCT. 4, 1912.
1,165,797.
Patented Dec. 28, 1915.
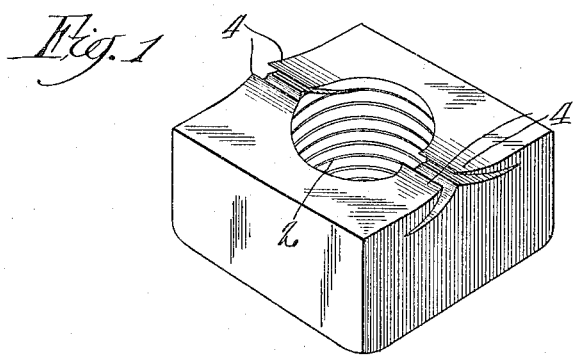
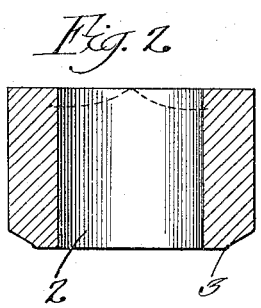
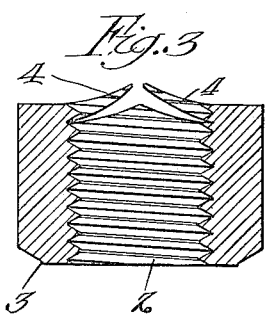
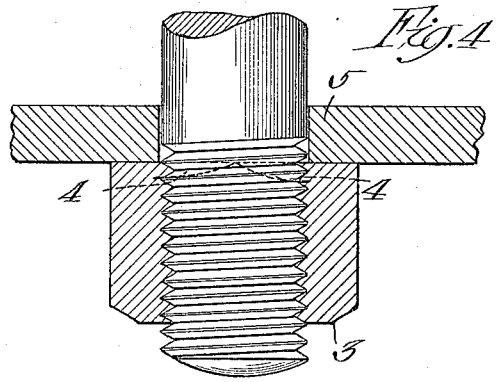
Witnesses:
Earl G. Howe
Robert S. McCreadie
Inventor:
Eugene E. Maher.
by 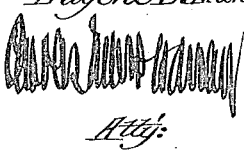
Atty.

UNITED STATES PATENT OFFICE.

EUGENE E. MAHER, OF CHICAGO, ILLINOIS, ASSIGNOR TO K. NUT CO., OF CHICAGO, ILLINOIS, A CORPORATION OF ILLINOIS.

LOCK-NUT.

1,165,797. Specification of Letters Patent. Patented Dec. 28, 1915.

Application filed October 4, 1912. Serial No. 723,861.

*To all whom it may concern:*

Be it known that I, EUGENE E. MAHER, a citizen of the United States, and a resident of Chicago, Cook county, Illinois, have invented certain new and useful Improvements in Lock-Nuts, of which the following is a specification.

My invention relates generally to means for locking nuts upon and with threaded members such as bolts and the like.

The general object of my invention is to provide an extremely powerful one-piece lock nut which can be manufactured at low cost and which will automatically lock itself upon a bolt when screwed against a load surface.

A particular object of my invention is to provide a simple lock nut which shall be of substantially the same size as an ordinary nut adapted for a like size bolt; which shall by forceful engagement with the load surface act to clamp the bolt at a number of places, for the purpose of providing uniformly locked nuts.

My invention consists generally in a self locking nut of such form, proportion and arrangement that the previously stated objects as well as others which will subsequently appear are attained.

My invention will be more readily understood by reference to the preferred form of my invention which is illustrated in the accompanying drawings, and in which;

Figure 1 is a perspective view of a lock nut embodying my invention; Fig. 2 is a cross sectional view of my nut in the process of manufacture; Fig. 3 is a cross sectional view illustrating the completed nut; Fig. 4 is a sectional view showing the nut locked in position upon a bolt and engaging a load surface.

From experimentation and research of nut and bolt conditions and from actual practice, particularly in the use of nuts and bolts with that class of machinery which is in a state of constant vibration or which at times vibrates violently, I have determined that a nut to be of practical value in the first instance must be one which can be cheaply manufactured. Further it must be of such form that an ordinary wrench can be used to apply it and it should preferably be of such form that no especial skill is necessary to apply it properly. A further requirement of such a nut is that it be capable of being locked on a bolt projecting from the load surface not an appreciably greater distance than that length of bolt which is necessary to accommodate an ordinary nut having a like number of threads and adapted to withstand a like shearing strain. It is also essential that the application of the lock nut to the bolt shall not distort either the threads of the bolt or the nut to such an extent that the nut can not be removed and both the nut and bolt used again.

I have discovered that a nut may be ever so tightly locked at but one place around the bolt circle and it will still, when subjected to vibration, work its way off the bolt. The one point locking contact seems to shift or trail around the bolt which is probably due to the fact that the opposite side of the nut is comparatively loose. To prevent this action, the nut should be locked at at least two points which are preferably diametrically opposite. A greater number of oppositely disposed locking forces is even more desirable and acts more effectively to prevent undesired rotation of the nut upon the bolt.

Having thus described the requirements of a commercially practical nut and that locking action which is most effective, I shall describe in detail my improved nut lock embodying the necessary and desirable features previously named. I have indicated in the drawings a square nut, but I wish it to be understood that I may provide lock nuts of any desired polygonal form without sacrificing the advantages of my invention. When forming my nut by a hot pressed method I preferably sever a piece of metal from a bar and simultaneously form a bolt hole in the severed metal. Fig. 2 indicates the nut after it is severed from the bar and provided with a bolt hole 2. In the formation of the bolt hole a crown 3 is formed at one end of the nut. Through long usage this crown is readily recognized, as the top or non-load end of the nut. I want to retain this well recognized feature in my nut. Since the locking portion of my nut is to contact the load surface, I form it on the end opposite to the crown. It comprises a plurality of wing-like members 4 integral with the nut. I have here shown four of these wing members which I shall herein refer to as locking wings. These locking wings are set up from the body of the nut by cutting into the nut from two opposite sides along the dotted lines indicated in Fig. 2. In setting up the wings 4 I preferably use a tool of such form that the wings are given an upward angle and are spaced from the body of the nut by substantially wedge-shaped recesses. In forming the wings 4 I also proceed in manner to remove but little metal so that the locking wings can be depressed or reformed to initial position without danger of breaking them. After the formation of the wings I thread or tap the bolt hole thereby providing a plurality of regularly formed threads in the body of the bolt and portions of a plurality of regularly formed threads on the spaced locking wings. To lock my nut in place upon a bolt it is but necessary to start it on and set it home like an ordinary nut. The nut is tapped to start on with desired freedom and may be easily and quickly rotated until the locking wings 4 engage the load surface 5. Considerable effort is required to advance the nut beyond this point since the further advancement causes the depression of the locking wings and the resulting forceful contact of the locking wing threads with the contiguous bolt threads. When the nut has reached the position indicated in Fig. 4 the locking wings are restored to substantially preformed position and act powerfully to grip the bolt at four separate places. The locking forces it will be seen are opposed, that is, they are equally distributed on each side of the bolts. There is therefore no possibility of the nut shaking loose as is the case when the nut is locked on only one side.

I may make the metal of my nut of such texture that when the locking wings are once set back they will retain this position irrespective of engagement with the load surface, or I may make the metal of such texture that continued engagement with the load surface is necessary to hold the locking wing in replaced position. In the first instance my nut will be retained in locked position even though the load surface should recede from the nut as it sometimes does. In the second instance the locking wings will spring back as the load surface recedes and the locking force will thus be relieved.

From the foregoing detailed description of my lock nut it is obvious that it is a commercially practical lock nut within the definition previously given. Slight modifications as to the relative size of the locking portion and the body of the nut and of the disposition of the locking wings may be made without departing from my invention defined by the appended claims and for this reason I do not wish to be limited to precisely the nut shown and described.

Having thus described my invention, I claim as new and desire to secure by Letters Patent:

1. A one-piece lock nut having a bolt hole and a plurality of pairs of integral locking wings formed flaringly up from the end of the nut body, on opposite sides of said hole, the wings of each pair pointing toward each other and said hole and wings being threaded after the formation of the latter, for the purposes described.

2. A self locking nut of substantially standard nut proportions having a bolt hole and a pair of integral locking wings formed flaringly up from the working end of the nut at one side of said hole and pointing toward each other, said hole and wings being threaded after the formation of the latter and said wings being adapted to resume positions within the confines of the nut to lock the same on a bolt when worked against a load surface.

3. A self locking nut comprising a body of metal of substantially standard nut proportions provided with a bolt hole, and two pairs of oppositely disposed locking wings cut and flared up from the load end of the nut body on each side of the bolt hole and within the projected side planes of the nut, said locking wings being spaced from the nut body by substantially wedge shaped recesses, and both said bolt hole and said locking wings being provided with screw threads, for the purposes described.

In testimony whereof, I have hereunto set my hand this 1st day of October, 1912, in the presence of two subscribing witnesses.

EUGENE E. MAHER.

Witnesses:
ARTHUR W. NELSON,
EARL E. HOWE.